United States Patent [19]
Picard

[11] 3,785,613
[45] Jan. 15, 1974

[54] SEQUENCING VALVE CONTROL APPARATUS AND SYSTEM

[76] Inventor: Joseph A. R. Picard, 9792 La Arena Cir., Fountain Valley, Calif. 92708

[22] Filed: Nov. 15, 1971

[21] Appl. No.: 198,745

[52] U.S. Cl.................. 251/56, 60/97 SE, 91/189, 92/2
[51] Int. Cl. ... F16k 31/12, F01b 21/02, F011 15/00
[58] Field of Search............................ 251/56; 92/2; 91/171, 182, 186, 189, 191, 303–306, 310, 403; 60/97 SE

[56] References Cited
UNITED STATES PATENTS

| | | | |
|---|---|---|---|
| 2,085,688 | 6/1937 | Schuchman et al. | 251/56 X |
| 2,326,686 | 8/1943 | Rutledge | 251/56 X |
| 3,094,902 | 6/1963 | Riopelle | 91/306 X |
| 3,137,212 | 6/1964 | Rose | 60/97 SE |

FOREIGN PATENTS OR APPLICATIONS

| | | | |
|---|---|---|---|
| 272,733 | 4/1951 | Switzerland | 91/189 |

Primary Examiner—Irwin C. Cohen
Attorney—R. Welton Whann et al.

[57] ABSTRACT

Control and power actuating means for the sequential operation of a valve component, particularly of relatively large valve units, wherein the valve component is required to be moved in going from one operating position to another through a succession of linear and rotational movements in opposite directions, in which one power actuator is selectively energizable to move a positioning member for the valve component in axially reciprocal directions, and another power actuator is selectively energizable to rotate the positioning member in opposite directions, sequential or cyclic operations of the actuators for changing the valve from one operating position to another being interlocked and determined by a sequencing valve which is responsive to movements of the valve positioning member.

8 Claims, 11 Drawing Figures

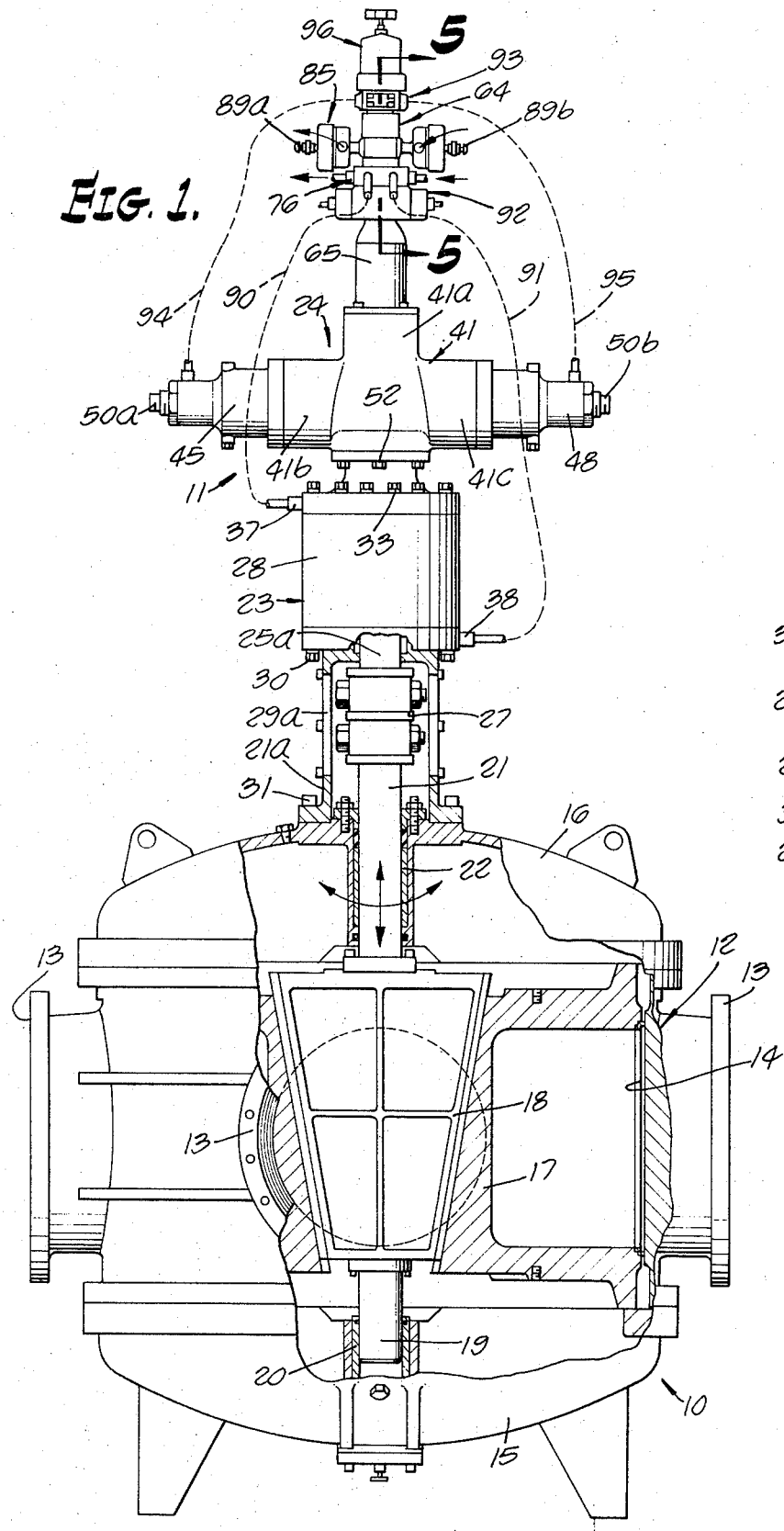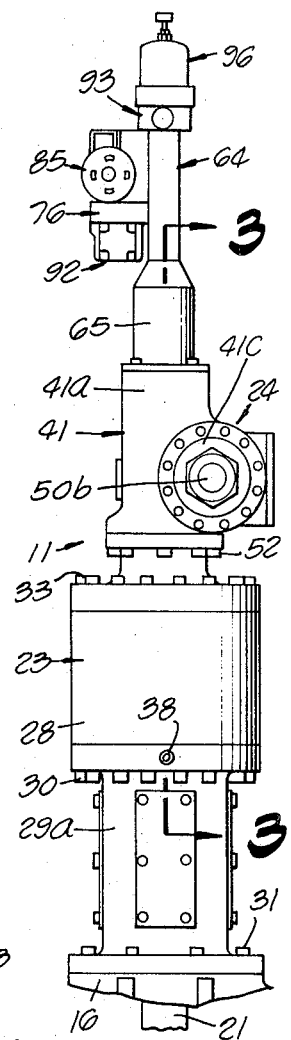

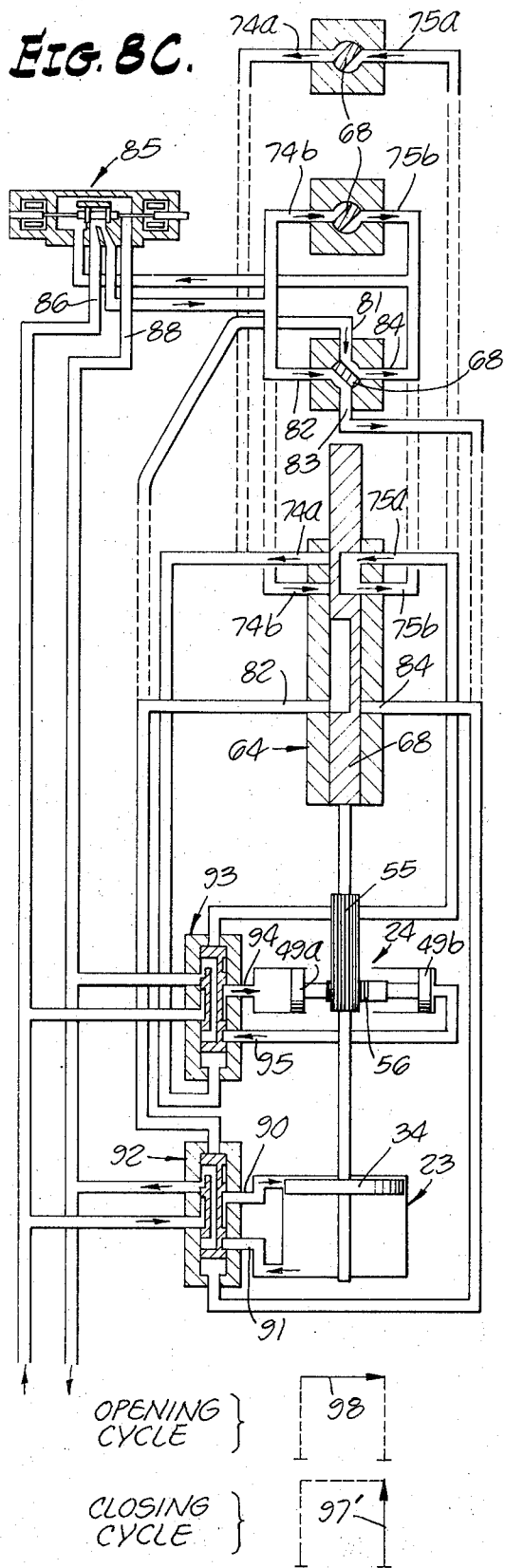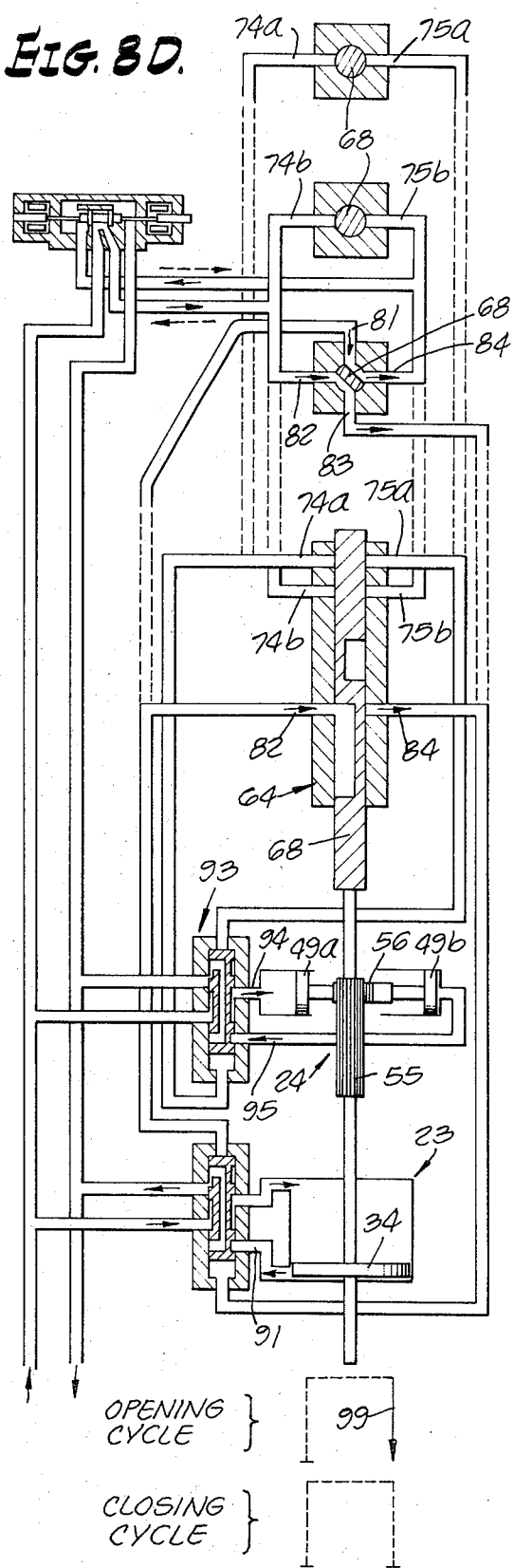

SEQUENCING VALVE CONTROL APPARATUS AND SYSTEM

BACKGROUND OF THE INVENTION

The present invention relates generally to valves and their actuation.

In relatively large valves, such as used in the petroleum and pipeline industry and which may be of the order of 5 or 6 feet in diameter, the movable components are of such massive size that manual operation by the usually known available mechanical devices is impractical and too slow.

It has, of course, been generally known to utilize power actuators for the opening and closing of valves, particularly valves of a smaller type in which a simple lifting and seating movement, or rotational movement is required in order to relatively shift the valve components from one operating position to the other.

Difficulties arise, however, in the case of extremely large valves of the type with which the present invention is primarily concerned, since such valves usually embody an arrangement which requires a combination of movements in different directions in order to change a valve from one operating condition to another. For example, the valve component in going from one operating position to another may require a succession of linear movements such as raising and lowering, and rotational movements in opposite directions. Thus, the control of the power actuators for accomplishing such movements in a proper prescribed order is no longer a simple matter, but necessitates in the ideal control system a proper sequencing of the power actuator devices, and an interlocking of their operations in such a manner that a predetermined sequence will be assured, and in the event an operating cycle is for any reason interrupted, continued operation in an improper manner, which could damage the valve, will be prevented.

In one heretofore known arrangement, solenoid control valves and associated electric limit switches have been utilized, but this did not work entirely satisfactory and was not too reliable, nor could the control be made fail-safe. In the event that it became necessary to manually control the sequencing operations of such heretofore known arrangement, it was possible to inadvertently depart from the correct sequence of operations, and effect an improper sequence which could damage the valve.

In the present invention, the above noted problems have been uniquely solved by utilizing a sequencing valve for controlling the cyclic energization of the fluid operable power actuators, the sequencing valve being responsive to and interlocked with the movements of the valve components by means of the power actuators.

SUMMARY OF THE INVENTION

The present invention relates generally to valves, and is more particularly concerned with control means for sequencing and coordinating the movements of a valve member in going from one operating position to another.

Having in mind the inadaptability of the presently known controls for accomplishing the desired operating conditions in large valves, it is one object of the present invention to provide unique control means for sequencing the energization and operation of a plurality of power actuating devices for moving a valve component from one operating position to another through a plurality of paths having different directions of movement.

A further object is to provide valve control means according to the foregoing object, wherein the sequencing means are controlled by and are responsive to the successive movements of the valve component.

Another object is to provide a fail-safe sequencing control for use with relatively large valves, in which a plurality of power actuators are cyclically energizable to move a valve component through multiple paths of movement in order to obtain a specific valve operating condition.

Another object is to provide improved sequential control means for a valve component in which the various operations are hydraulically interlocked, so that succeeding operations will be forced to follow the required and proper sequence.

Still another object is to provide improved sequencing control capable of actuating a valve component by raising it from an operating position, rotating the same and then reseating the component by lowering movement.

Yet another object is to provide sequential control means capable of operating a valve member by moving it from one operating position by a raising movement and subsequent rotational movement to another operating position, then by reversing the operation return the valve member to its original position.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a front elevational view of a valve having sequencing valve control means for actuating a valve component according to the features of the present invention, portions being cut away to show details of the valve component;

FIG. 2 is a fragmentary elevational view showing the mounting relationship of the control devices, as utilized in the present invention;

FIGS. 8A, 8B, 8C and 8D are views schematically illustrating one form of sequential operation of valve control apparatus according to the present invention.

DESCRIPTION OF THE PREFERRED EMBODIMENT

Figure 3:
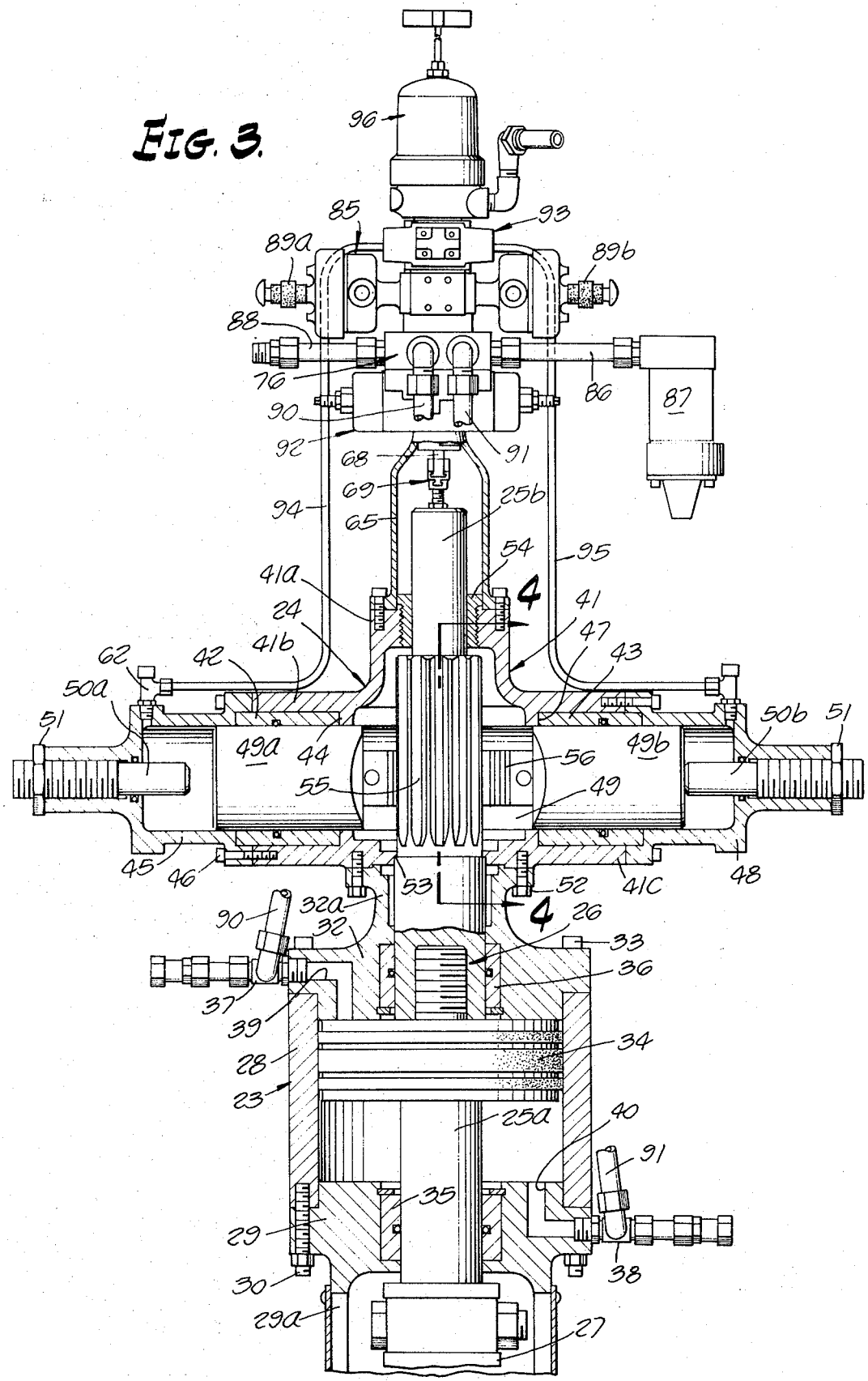
FIG. 3 is an enlarged fragmentary front view of the control devices, the main power actuators being shown in section, taken substantially on line 3—3 of FIG. 2.

Referring more specifically to the drawings, there is illustrated in FIG. 1 a main valve unit 10 upon which there is mounted sequencing valve control and actuating apparatus, as generally indicated at 11 for operating the valve according to the present invention.

Although the main valve is shown as being of the four-way type, it is to be understood that the control and actuating apparatus may also be utilized with other types of valves where it is required to utilize a combination of linear movements of a valve component as well as rotative movements thereof in going from one valve operating position to another. More specifically, the disclosed main valve briefly comprises a main body 12 which is formed with four tubular connections arranged in quadrature and having pipe connection flanges 13. These connections lead to an internal cylindrical cavity 14 which is closed by a bottom closure 15 and a top bonnet 16.

For varying the flow paths between the valve connections, there is provided a rotatable slip structure of conventionally known design which is operatively associated with a wedging type plug structure 18. The plug is supported by a lower trunion 19 in an associated gland 20 carried by the bottom closure 15, and an upper trunion 21 supported in an upper bushing gland 22 carried by the top bonnet 16.

The valving arrangement described above is of conventional construction and well known in the industry, particularly for use in relatively large valves as utilized in the petroleum and pipeline industry. Briefly, the operation of the above described valve component in changing from one operating position to the other necessitates the utilization of both linear and rotative movements of the plug structure 18. The plug 18 in its lowermost position operates to wedge the slip ends outwardly into sealed relation with the wall of the cavity 14. To change the position of the slip, the plug 18 is moved upwardly by applying a suitable force to the upper trunion 21, which serves as a positioning member. With the plug in a raised position, as shown in FIG. 1, the opposite ends of the slip are retracted away from the cavity wall and are now free to be moved to a different position which is accomplished by applying a rotative force to the positioning member. When the slip is rotated to the desired position, the plug 18 is lowered by reversing the linear acting force applied to the positioning member. This action forces the opposite ends of the slip outwardly into sealed relation with the wall cavity. In order to return the slip to its original position, a reversal of the above operation is effected.

While the valve control and actuating apparatus 11 will hereinafter be described in particular with reference to the foregoing valve structure, the control apparatus may be readily utilized according to the present invention with valve structures conventionally known as "twin seal" type, wherein the valve component, for example, is raised from a closed position and then rotated to bring the component into a valve opened position. A reverse operation is followed in moving the valve component from valve opened to valve closed position.

Axial raising and lowering movements of the valve component is effected by means of a first power actuator 23 and rotational movements are effected by a second power actuator 24, these actuators being operatively connected with a sectionalized piston rod structure in which a section 25a is coupled with a section 25b by a threaded end-to-end interconnection as indicated at 26. The lowermost end of the piston rod is connected in axial alignment to the upper trunion or positioning member 21 by means of a suitable coupling 27.

As best shown in FIG. 3, the first power actuator comprises a cylinder-piston unit in which the cylinder includes a cylindrical sleeve member 28. The lower end of this sleeve is secured to an end closure 29 by means of retaining bolts 30, this closure being axially extended to provide a tubular supporting bracket portion 29a for housing the coupling 27. This extension is connected at its lowermost end to the top bonnet 16 by means of appropriate retaining bolts 31. The other end of the cylindrical sleeve 28 is closed by an end cap 32 which is secured by suitable retaining bolts 33. The end cap 32 is upwardly extended to provide a tubular supporting bracket portion 32a for the second power actuator 24 which will hereinafter be described in detail.

The cylindrical sleeve member is operatively associated with a piston 34 which is in this case carried by the rod section 25a, this section and the connected section 25b being reciprocably and rotationally supported respectively in a bearing 35 mounted in the end closure 29, and a bearing 36 mounted in the end cap 32. The opposite ends of the cylinder are in communication with appropriate fluid supply terminal connectors 37 and 38, the former being connected through a bore passage 39 with the interior of the cylinder at the upper end, and the latter being connected through a bore passage 40 with the other end of the cylinder whereby the piston 34 may be selectively operated by control devices to be described later in raising or lowering directions for actuating the associated valve component.

The second power actuator, as best shown in FIG. 3, comprises an inverted T-shaped hollow housing 41 which is constructed with a central upstanding leg 41a and axially aligned oppositely extending legs 41b and 41c which respectively form supports for cylinder liners 42 and 43. The cylinder liner 42 is retained in operative position against an abutment shoulder 44 by means of an end cap 45 which is secured by means of retaining bolts 46 and forms an internal extension of the cylinder cavity. The cylinder liner 43 is similarly retained against abutment shoulder 47 by an end cap 48. A freely movable piston 49 is supported for reciprocal movement, this piston having a left hand piston end 49a operatively associated with the piston liner 42, and a right hand piston end 49b associated with the piston liner 43. Movement of the piston assembly in opposite directions is limited by means of adjustable stop screws 50a and 50b respectively supported in neck portions of the end caps 45 and 48. Each stop screw is provided with a lock nut 51 for retaining the stop screw in its adjusted position.

The housing 41 is secured to the bracket portion 32a by means of retaining bolts 52 in such a position that the rod section 25a will be axially aligned within the leg 41a with the lowermost portion of the rod section extending through an opening 53 and the upper end portion being operatively positioned within a bushing 54, the end portion of the rod projecting outwardly beyond the bushing.

Figure 4:
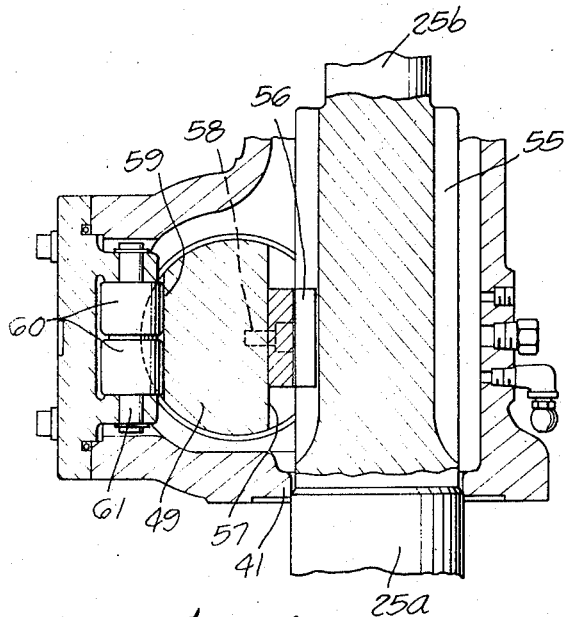
FIG. 4 is a fragmentary sectional view through the rotating power actuator, taken substantially on line 4—4 of FIG. 3.

As best shown in FIG. 4, the rod 25b is laterally offset with respect to the piston 49, the rod portion being provided with an elongate pinion 55, the teeth of which are arranged to mesh with the teeth of a linear rack 56, during raising and lowering movements of the piston rod. The linear rack is mounted on a recessed wall surface 57 of the piston and held in fixed position thereon by means of anchor bolts 58. The opposite side of the piston from that on which the rack is mounted is provided with a flat bearing surface 59 having engagement with anti-friction back-up rollers 60 which are supported upon a suitable shaft 61.

Fluid supply connections are made to terminal fittings 62 and 63 which are in communication with the outer ends of the cylinders and permit the selective energization thereof to rotate the rod section 25b in the desired direction.

Figure 5:
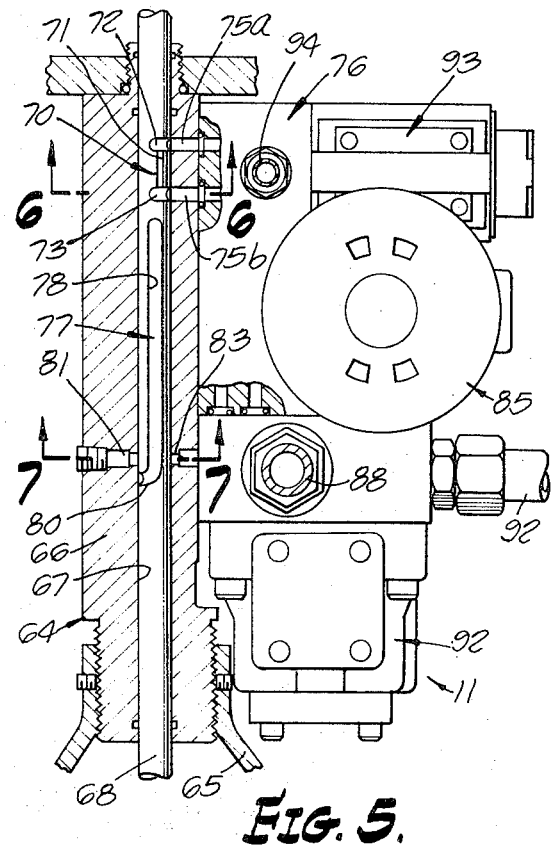
FIG. 5 is an enlarged fragmentary sectional view showing details of the sequencing valve, taken substantially on line 5—5 of FIG. 1.

A most important feature of the invention is concerned with the sequencing valve control for energizing and deenergizing the power actuators 23 and 24 in the proper sequence in order to cyclically operate these power devices in the proper manner to provide the required movements of valve component for changing from one valve operating position to another valve operating position. The key device for this purpose comprises a sequencing valve as generally indicated at 64. As shown in FIGS. 2 and 5, this valve is supported upon a tubular bracket 65, the lowermost end of this bracket being attached to the leg 41a so as to extend thereabove, and at its upper end is secured to a sequencing valve body 66. The valve body 66 is of cylindrical configuration and is formed with an axially extending bore passage 67 which has its ends opening in the end surfaces of the valve body. An elongate rod member is axially slidable and rotatably supported in the bore passage and is constructed to function as a spool valve 68 which is shown in FIG. 5 in its raised position. The lowermost end of the spool valve 68 is connected by means of a suitable coupling, as indicated by the numeral 69, to the uppermost end of the rod section 25b. As thus arranged, it will be appreciated that the movements of the spool valve will responsively follow the movements of the rod section 25b which is connected with the upper trunion 21 which constitutes the positioning member for the main valve component.

Figure 6:
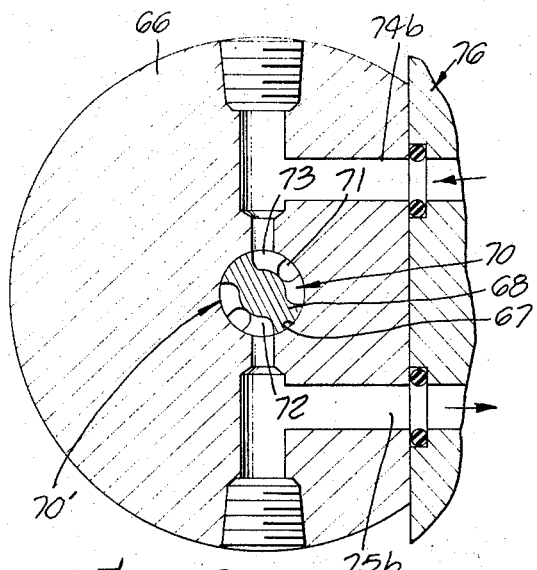
FIG. 6 is an enlarged transverse sectional view at the upper end of the sequencing valve, taken substantially on line 6—6 of FIG. 5.
Figure 8A:
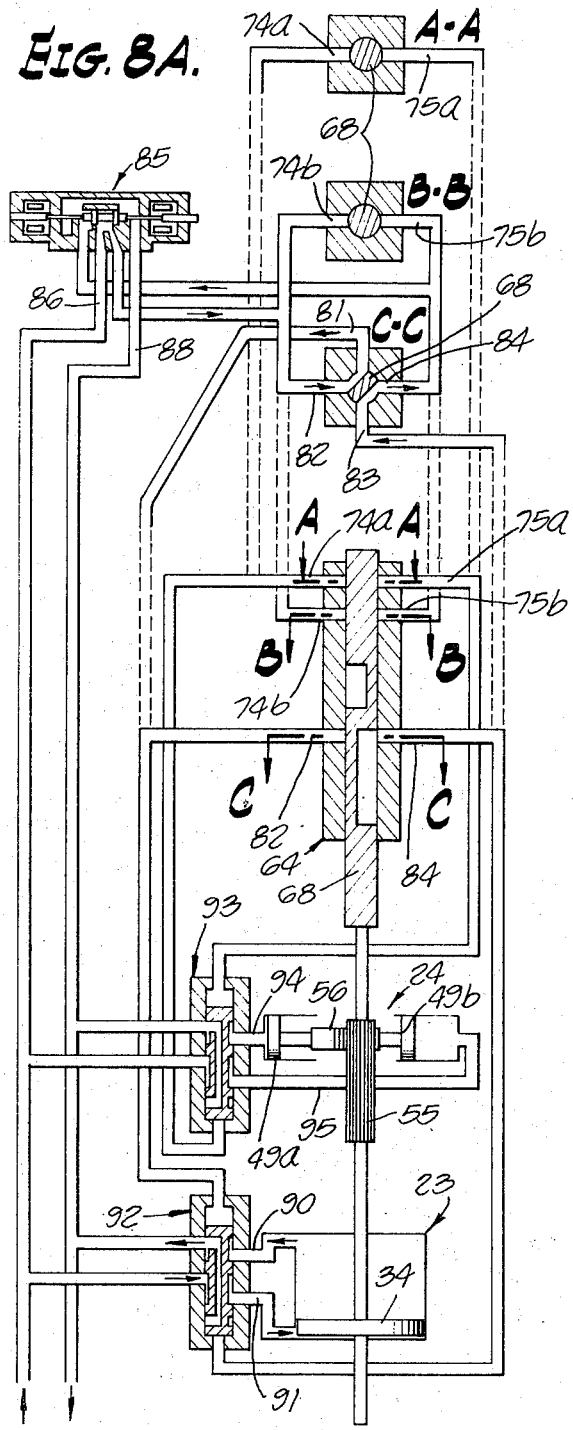
Figure 8B:
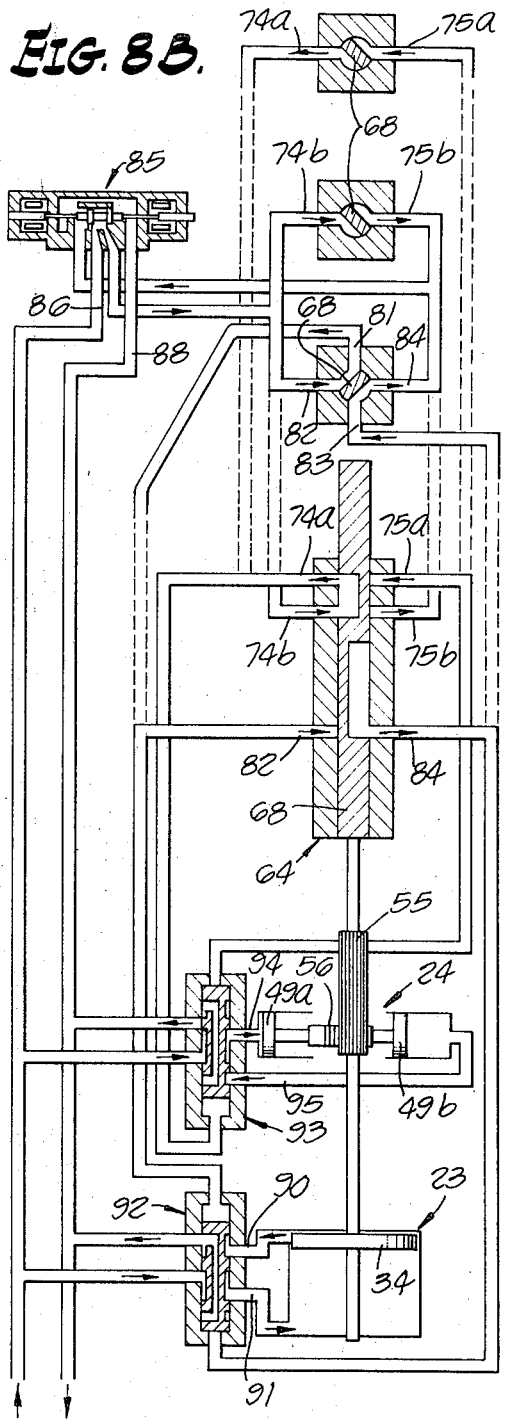

At its uppermost end, the spool valve 68, as shown in FIGS. 5 and 6, is provided on its diametrically opposite sides with a pair of similar I-grooves 70 and 70′, each of these grooves comprising a longitudinally extending groove 71 which is connected at its respective ends with short circumferentially extending arcuate grooves 72 and 73. In the raised position of the spool valve, as shown in FIG. 5, the I-grooves 70 and 70′ are operable in angularly disposed rotative positions of the spool valve to alternately connect a pair of vertically spaced fluid connections 74a–74b and 75a–75b as shown in FIG. 8A. When the spool valve 68 is in lowered position, communication between the fluid connections is closed. The connections 74a, 74b, 75a and 75b are in controlling communication with other devices, as will hereinafter be explained more fully, through fluid flow passages contained in a manifold structure as generally indicated at 76.

Figure 7:
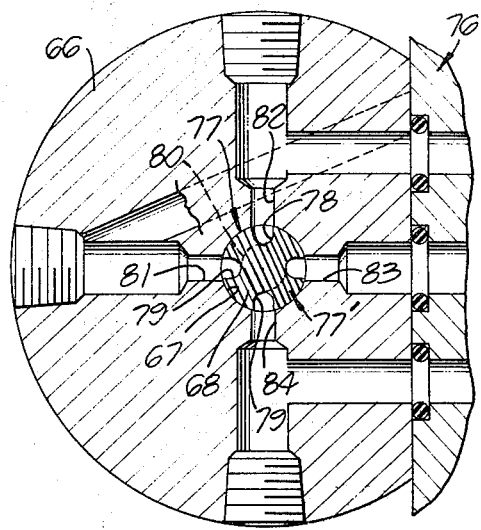
FIG. 7 is a similar view taken substantially on line 7—7 of FIG. 5.

The valving portion described above is utilized for controlling the operation of the power actuator 24 for producing rotational movements of the positioning member. Another valving portion on the spool valve 68 is utilized to control the operation of the power actuator for providing linear axial movements of the positioning member. This control portion comprises a pair of diametrically positioned elongate U-shaped grooves 77 and 77′ as best shown in FIGS. 5 and 7. Each of these U-shaped grooves comprises parallel elongate axially extending grooves 78 and 79, these grooves at their bottom ends being connected by a bridging groove 80. Four fluid connections 81, 82, 83 and 84 are provided in 90° angular spacings around the bore passage 67 for operative association with the respective grooves 77 and 77′ to provide sequential control operations of the power actuator 23 in a manner which will be hereinafter more fully described in detail. These fluid connections are brought out to one side of the valve body 66 where they are connected with the required flow passages contained within the manifold 76.

The initiation of the sequence of operating movements for changing the valve component from one operating position to another is initiated by means of a main control valve 85 which is mounted on the manifold structure 76 and has connections therethrough with a fluid supply connection 86 which enters through a filter 87, and a return connection 88. The main control valve is a two-position solenoid actuated valve with suitably mounted solenoids at each end which are selectively energizable to actuate the valve from one position to the other. Manual override actuators 89a and 89b, respectively, at the opposite ends of the valve structure, permit selective manual operation in the event of power failure. The main control valve is connected in the manifold structure with the sequencing valve 64 and is operative with it to control supply conduits 90 and 91 which lead to the opposite ends of the first power actuator 23. Although it is within the scope of the present invention to operate the actuators 23 and 24 directly from the sequencing valve 64, it is preferred that the sequencing valve be utilized to selectively operate pilot valves for the control of the power actuators. For this purpose, a pilot valve 92 is supported on the manifold structure and is operative to control the operation of the power actuator 23 through the control conduits 90 and 91. For controlling the operation of the power actuator 24, a conventional pilot valve 93 is mounted on and connected with the manifold structure 76, this valve having control conduits 94 and 95 which lead from the manifold to the terminal fittings 62 and 63 of the actuator 24.

The uppermost end of the spool valve 68 is connected with a mechanical-electric indicating device as generally indicated at 96 for indicating the position of the main valve component.

The sequencing operation of a valve of the type shown in FIG. 1 will now be explained by reference to FIGS. 8A, 8B, 8C and 8D. The successive movements of the valve component in going from one operating position to the other, which for convenience may be called an opening cycle, begins with the system in a normal position as shown in FIG. 8A, in which the positioning member 21 of the valve is in its lowermost position, has been rotated in a counterclockwise direction to the limit of its rotational movement. In this position, it will be observed that fluid flow between the fluid connections 74a–74b, and 75a–75b, is cut off by the upper end portion of the spool valve 68.

Operation of the valve movement is now initiated by energizing the main control valve 85 or by manually actuating the valve so that the spool will be moved towards the right to a position which will connect the fluid supply connection 86 with fluid connection 82 which permits flow of operating fluid to the upper end of pilot valve 92, which is then shifted so as to connect the control conduit 91 with the fluid supply connection 86 and the control conduit 90 with the return connection 88. Actuating fluid now flows into the bottom of the power actuator 23 and forces the piston 34 to begin its upper travel. The upward movement of the valve component is indicated by the arrow 97 at the bottom of FIG. 8B.

When the spool valve 68 reaches the limit of its upper travel, it operates to interconnect fluid flow from fluid connection 74b to 74a, and from 75a to 75b, which applies actuating fluid to the bottom of pilot valve 93 and thus connects control conduit 94 with fluid supply connection 86, and control conduit 95 with the return connection 88. Fluid pressure is thus applied to the piston 49 of the power actuator 24 so as to move it towards the right to the limit of its movement as shown in FIG. 8C. This movement causes rotation of the valve component as indicated by the arrow 98 at the bottom of FIG. 8C.

During this rotative movement, the spool valve 68 will be shifted, as shown in FIG. 8C, to maintain fluid flow between fluid connection 74b and 74a, and between 75a and 75b. At the same time, fluid flow is established from fluid connection 82 to fluid connection 83, and from fluid connection 81 to fluid connection 84. Fluid pressure is now applied to the bottom of pilot valve 92, and this valve will operate to connect the control conduit 90 of the power actuator 23 with fluid supply connection 86, and fluid control conduit 91 with the return connection 88. As thus energized, the piston 34 therein will be moved downwardly to the position shown in FIG. 8D, the movement of the valve component being indicated by the arrow 99. The valve component is thus in its new operating position and will remain in this position until the main control valve is shifted to its other position for returning the valve through a reverse operation to its position as shown in FIG. 8A.

Upon reversal of the main control valve 85, the direction of flow to the sequencing valve 64 will be reversed so that the directions of operation of the valve component will operate in a closing cycle as indicated by the arrows 97', 98' and 99'.

From the above description, it will be appreciated that the sequencing valve provides a positive interlock between the power actuators, and that in the case that something should happen to interrupt the completion of the movement of the valve component from one operating position to the other, the cycle will have to be completed. A fail-safe arrangement is thus provided which prevents inadvertent operation in a manner which might damage the valve.

From the foregoing description and drawings, it will be clearly evident that the delineated objects and features of the invention will be accomplished.

Various modifications may suggest themselves to those skilled in the art without departing from the spirit of my invention and hence I do not wish to be restricted to the specific forms shown or uses mentioned, except to the extent indicated.

I claim:

1. Control and actuating means for the sequential operation of a valve mechanism, comprising:
   a. a valve component requiring linear and rotational movement in its operation;
   b. a positioning member connected with said valve component, said member being supported for axial reciprocable movements, and rotational movements in opposite directions;
   c. a first power actuator connected with said positioning member and being selectively energizable to axially move said member in opposite directions;
   d. a second power actuator connected with said positioning member and being selectively energizable to rotate said member in opposite directions;
   e. main control means selectively operable to energize one of said power actuators to initiate a predetermined sequence of successive movements of said valve component by said power actuators; and
   f. movable sequencing control means operable in response to axial and rotational movements of said member for energizing said power actuators according to a said predetermined sequence of successive movements for said valve.

2. Control and actuating means according to claim 1, wherein said main control means comprises a solenoid operated reversing valve having manual override actuating means.

3. Control and actuating means according to claim 1, wherein the power actuators are fluid actuated.

4. Control and actuating means according to claim 3, including separate pilot valves for said power actuators, said pilot valves being controlled by said sequencing control means.

5. Control and actuating means according to claim 3, wherein said sequencing control means comprises a fluid control valve having a spool valve connected with and moved by said positioning member.

6. Control and actuating means according to claim 5, in which said sequencing fluid control valve provides a hydraulically interlocked sequence of operations of the power actuators, whereby the second actuator will not operate until the first actuator has completed its operation, and vice versa.

7. Control and actuating means according to claim 5, wherein said spool valve has axially spaced valving sections, one of said sections being operatively associated with fluid control ports for controlling the operation of said first power acutator, and the other of said sections being operatively associated with fluid control ports for controlling the operation of said second power actuator.

8. Control and actuating means according to claim 7, in which the spool is axially shiftable between spaced limit positions, the said one of said sections being operatively connected with its associated ports in one only of said limit positions, and the other of said sections is operatively connected with its associated ports in both of said limit positions.

* * * * *